US008459752B2

(12) United States Patent
Russell (10) Patent No.: US 8,459,752 B2
(45) Date of Patent: Jun. 11, 2013

(54) SYSTEM FOR WHEEL CLADDING AFFIXMENT

(75) Inventor: Martin E. Russell, Smyrna, TN (US)

(73) Assignee: Zanini Auto Grup, SA, Barcelona (ES)

( * ) Notice: Subject to any disclaimer, the term of this patent is extended or adjusted under 35 U.S.C. 154(b) by 364 days.

(21) Appl. No.: 12/843,950

(22) Filed: Jul. 27, 2010

(65) Prior Publication Data

US 2012/0025595 A1 Feb. 2, 2012

(51) Int. Cl.
*B60B 7/06* (2006.01)

(52) U.S. Cl.
USPC .............. 301/37.102; 301/37.24; 301/37.106

(58) Field of Classification Search
USPC .................. 301/37.101, 37.22, 37.23, 37.24,
301/37.26, 37.27, 37.28, 37.102, 37.31, 37.32,
301/37.33, 37.34, 37.11, 37.1, 37.35, 37.36,
301/37.106, 37.107, 37.39, 37.42
See application file for complete search history.

(56) References Cited

U.S. PATENT DOCUMENTS

| | | | | |
|---|---|---|---|---|
| 1,855,023 A * | 4/1932 | Kellogg | ..................... | 301/37.24 |
| 2,226,511 A * | 12/1940 | Hollerith | ................. | 301/37.101 |
| 2,404,390 A * | 7/1946 | Lyon | ......................... | 301/37.32 |
| 2,893,785 A * | 7/1959 | Lyon | ......................... | 301/37.36 |
| 5,873,637 A | 2/1999 | Ichikawa | | |
| 6,637,832 B2 | 10/2003 | Wrase | | |
| 6,779,852 B2 | 8/2004 | Van Houten | | |
| 6,916,072 B2 * | 7/2005 | Bernoni | .................... | 301/37.24 |
| 6,991,299 B2 | 1/2006 | Hauler | | |
| 2005/0012383 A1 * | 1/2005 | Hsieh | ..................... | 301/37.102 |

FOREIGN PATENT DOCUMENTS

| | | | |
|---|---|---|---|
| EP | 149935 A2 * | 7/1985 | |
| JP | 11-20823 | 8/1999 | |
| WO | WO 9307012 A2 * | 4/1993 | |

* cited by examiner

*Primary Examiner* — Kip T Kotter
(74) *Attorney, Agent, or Firm* — Seth Natter; Natter & Natter (57) ABSTRACT

A system for permanently securing wheel cladding to a wheel having a rim with a rim flange is provided. An annular affixment ring includes an outer periphery which seats within an undercut formed in the rim flange. A plurality of arcuate flanges extend from the inner face of the cladding and abut the inner periphery of the ring to maintain the outer periphery of the ring within the undercut. The ring includes axial apertures and the inner face of the cladding includes retention tabs having enlarged fluked ends which extend into the apertures to anchor the cladding to the ring. The ring can be constructed of one piece or formed of interfitting arcuate segments which are interlocked in end to end relationship.

18 Claims, 9 Drawing Sheets

SYSTEM FOR WHEEL CLADDING AFFIXMENT

BACKGROUND OF THE INVENTION

1. Field of the Invention

This invention relates generally to decorative vehicle wheels and more particularly to a system for permanently mounting a wheel cladding over the outer face of a vehicle wheel.

2. Antecedents of the Invention

Although wheel covers have continued to play a significant role with respect to providing a pleasant and stylized appearance to vehicle wheels in both OEM and aftermarket applications, there has been a trend in new car sales to equip vehicles with cast metal stylized vehicle wheels. Such trend has increased to the extent that stylized cast metal wheels have become standard equipment, not only on luxury vehicles, but in addition, on moderately priced vehicles.

Dynamic wheel balancing has been easier to achieve and maintain with cast metal wheels for the reason that compensation was not required for the additional mass of a wheel cover. Further, conventional wheel covers were subject to inadvertent dislodgment and consequent loss and, in addition, to loss by theft or vandalism.

While there has been a decrease in the number of available vehicle models, individual customer preferences and the availability of options has been a consideration in new vehicle marketing and sales promotion. Unfortunately, when cast metal wheels were standard or optional equipment with specific vehicle models, only one surface treatment for the wheel was available. Such limitation was a consequence of the costs involved in acquiring and maintaining inventories of numerous wheels for a particular vehicle model, each with the same dimensions and structure, but with different surface treatments. Wheel claddings, which covered the outer face of a vehicle wheel and which carried a decorative surface treatment have been previously employed for the purpose of providing a variety of available finishes to permanently cover the outer face of a stock cast vehicle wheel.

A variety of systems have been proposed for mounting wheel cladding to a vehicle wheel, such as adhesives, as disclosed in U.S. Pat. No. 5,458,401, which is incorporated herein in its entirety. Other proposed systems included the employment of snap tabs extending from the cladding into radially undercut recesses in a side of the wheel at a central wheel hub, as disclosed in U.S. Pat. No. 6,636,832. Such hub mounting arrangement did not serve to secure the radially outer periphery of the cladding to the wheel rim and was also subject to heat degradation.

SUMMARY OF THE INVENTION

A composite vehicle wheel includes a metal wheel having a hub, a rim with a rim flange having an annular undercut and a plurality of spokes interconnecting the hub to the rim. Overlying the exterior face of the wheel is a wheel cladding secured by an annular affixment ring having outer periphery which seats within the undercut of the wheel rim flange.

The affixment ring can be constructed of one piece or formed of interfitting arcuate segments and includes a plurality of axial pilot fingers which engage sockets formed in the wheel rim flange. A plurality of arcuate flanges extends axially from the inner face of the cladding and abut the radially inner periphery of the affixment ring at zones registered with the interfitting ends of the arcuate segments.

Fluked retention tabs, projecting axially from the inner face of the cladding, engage apertures formed in the affixment ring to anchor the cladding to the affixment ring.

From the foregoing compendium, it will be appreciated that it is an aspect of the present invention to provide an affixment system for wheel cladding of the general character described which is not subject to the disadvantages of the antecedents of the invention aforementioned.

It is a feature of the present invention to provide an affixment system for wheel cladding of the general character described which facilitates the manufacture of composite wheels with relatively low assembly costs.

To provide an affixment system for wheel cladding of the general character described which is well suited for economic mass production fabrication is a consideration of the present invention.

Another feature of the present invention is to provide an affixment system for wheel cladding of the general character described which permanently secures wheel cladding to a vehicle wheel without being subject to heat degradation.

An additional aspect of the present invention is to provide an affixment system for wheel cladding of the general character described which secures the periphery of the cladding to a wheel at the wheel rim.

Another consideration of the present invention is to provide an affixment system for wheel cladding of the general character described which precludes inadvertent dislodgment of the cladding.

Another aspect of the present invention is to provide an affixment system for wheel cladding of the general character described wherein the cladding is retained by an affixment ring seated in an undercut of a wheel rim flange.

Yet another consideration of the present invention is to provide an economical method for assembling a composite vehicle wheel.

A further feature of the present invention is to provide an affixment system for wheel cladding of the general character described which is long lasting.

Further aspects, features and considerations of the present invention in part will be obvious and in part will be pointed out hereinafter.

With these ends in view, the invention finds embodiment in certain combinations of elements, arrangements of parts and series of steps by which the said aspects, features, and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention.

DETAILED DESCRIPTION OF THE PREFERRED EMBODIMENT

Figure 1:
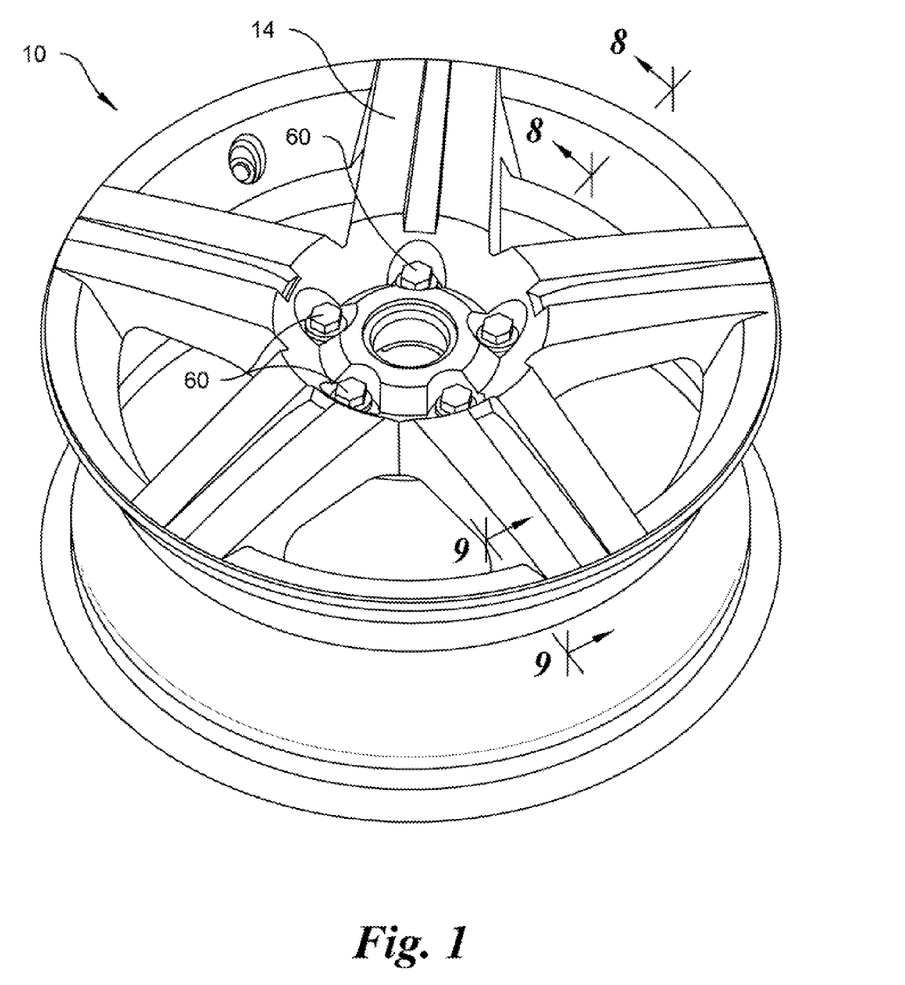
FIG. 1 is an isometric view of a clad metal wheel, with wheel cladding being permanently fixed to the wheel through an affixment ring in accordance with present invention.
Figure 2:
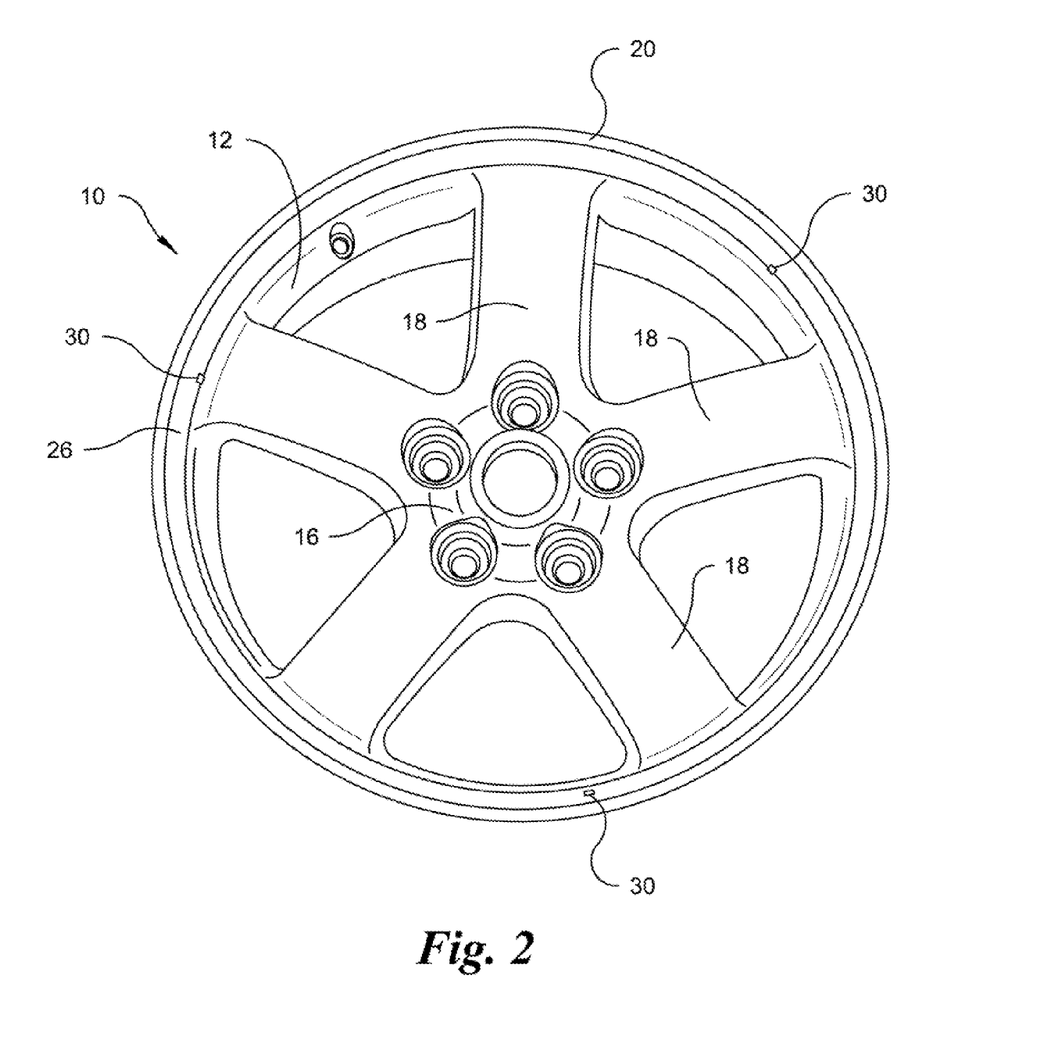
FIG. 2 is an isometric view of the wheel prior to mounting the affixment ring and cladding to the wheel.

Referring now in detail to the drawings, wherein like numerals will be employed to denote like components throughout, the reference numeral 10 denotes generally a metal wheel having a rim 12. In accordance with the invention, the axially outer face of the wheel 10 is overlaid with a wheel cladding 14, as illustrated in FIG. 1.

The wheel 10 comprises a hub 16 which is joined to the rim 12 by a plurality of spokes 18. Pursuant to the invention, the rim 12 includes a rim flange 20 having an undercut 22. An affixment ring 24 is positioned on a planar annulus 26 of the rim 12, with its outer periphery seated in the undercut 22. The affixment ring 24 includes a plurality of axial pilot fingers 28, illustrated in FIG. 3, FIG. 5 and FIG. 6, which are registered with sockets 30 formed in the annulus 26 of the wheel rim. The pilot fingers 28 assist in assembly and also assure that the affixment ring 24 will not rotate relative to the wheel rim 11.

Figure 3:
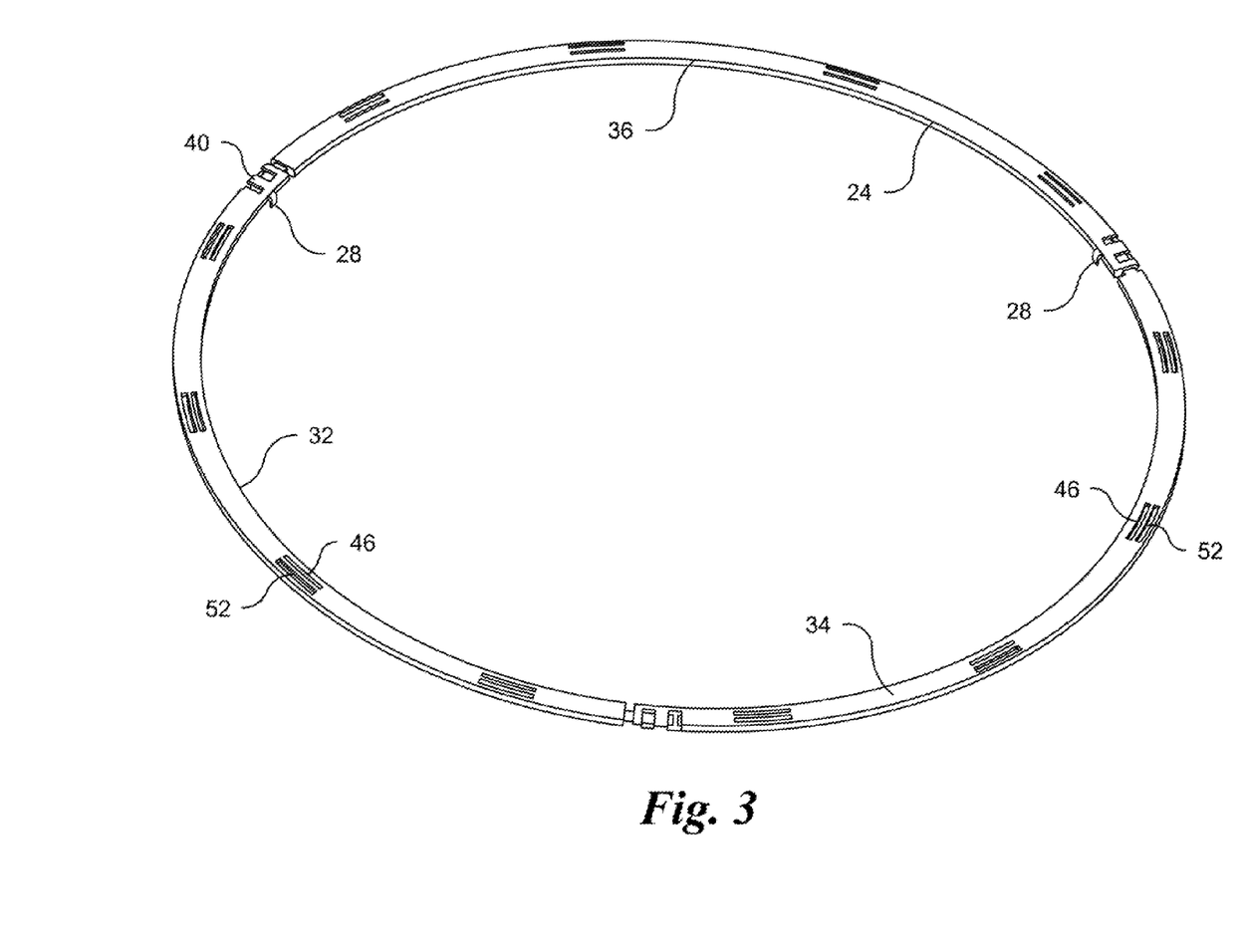
FIG. 3 is an isometric view of the affixment ring showing segments joined by mortise and tenon joints.

The affixment ring 24 may be unitarily formed of one piece molded construction or may optionally be formed of a plurality of arcuate ring segments 32, 34, 36 as illustrated in FIG. 3.

Figure 4:
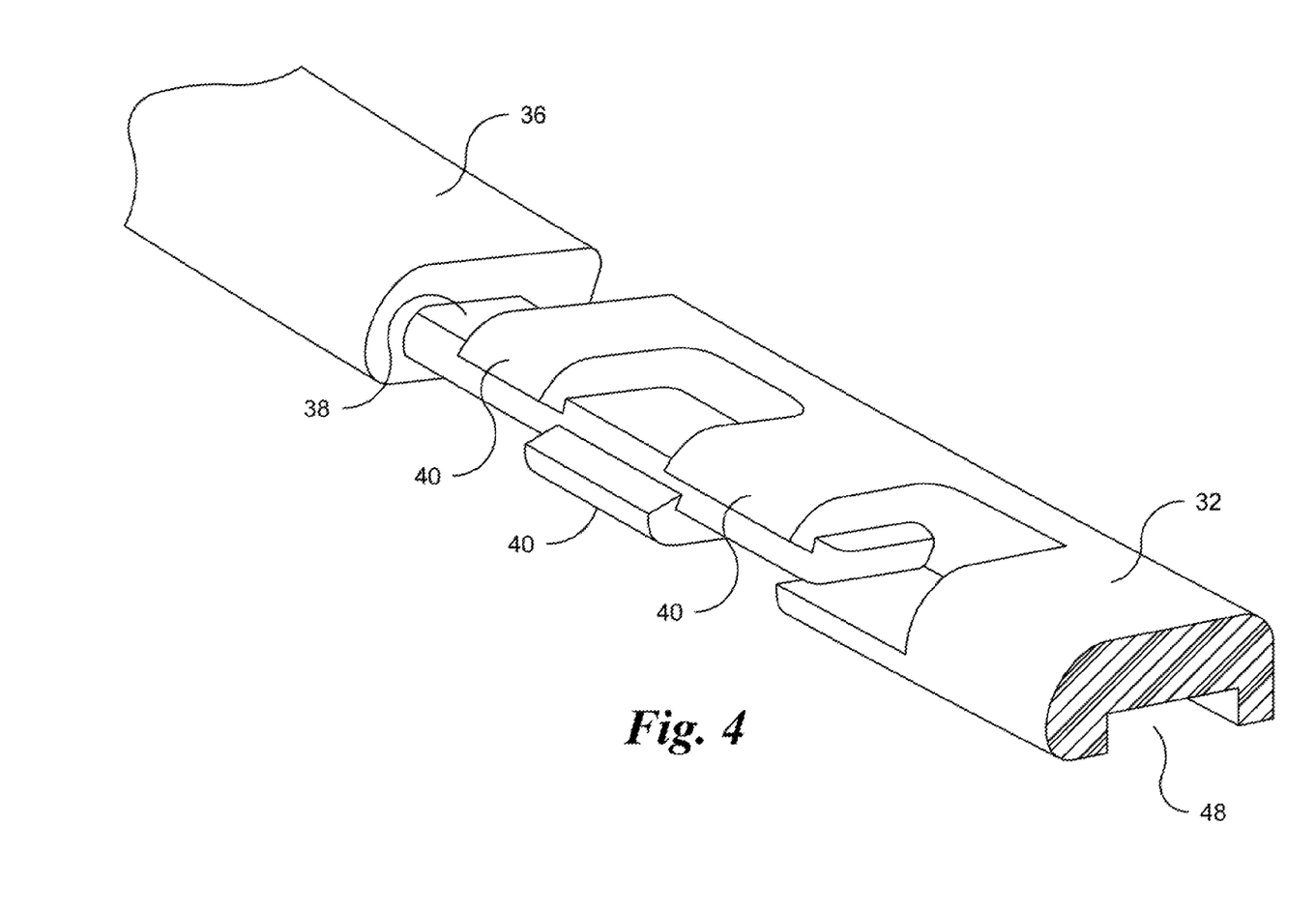
FIG. 4 is an enlarged scale fragmentary isometric view of the affixment ring and showing a mortise and tenon joint.
Figure 5:
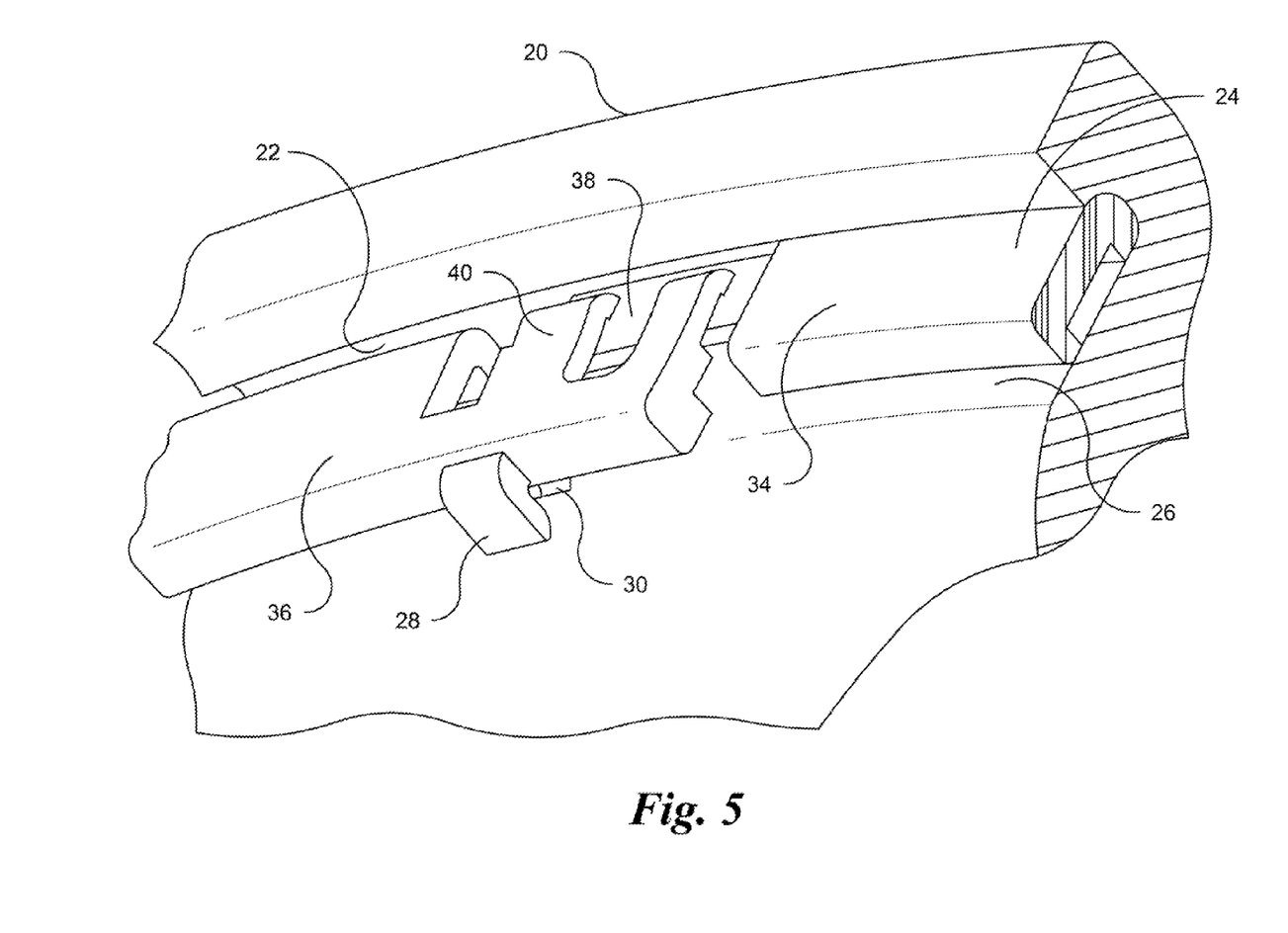
FIG. 5 is an enlarged scale fragmentary isometric view of the wheel rim and illustrating a stage of mounting of the affixment ring.

The ring segments, 32, 34, 36 interlock with one another through a tenon 38 which projects from one end of each segment. The opposite end of each segment includes a mortise formed of a plurality of staggered fingers 40 which project radially outwardly from the inner periphery of the affixment ring 24, as illustrated in FIG. 3 and FIG. 4. The tenon 38 may be engaged in the mortise by moving the mortise fingers 40 radially outwardly and simultaneously bending the fingers axially as illustrated in FIG. 5, until the latch end portions of each finger snap over the edge of the tenon to the portion illustrated in FIG. 4.

Figure 9:
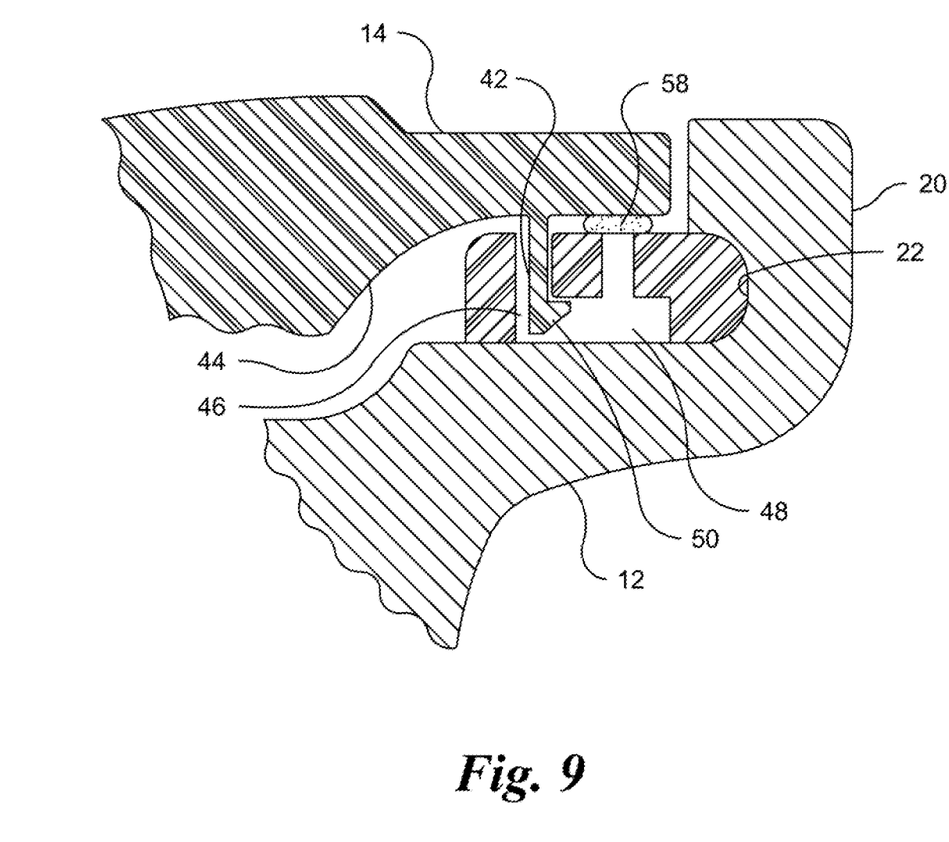
FIG. 9 is an enlarged scale fragmentary sectional view through the wheel rim of the clad wheel, the same being taken along the plane 9-9 of FIG. 1 and showing the retention tab engaged within a slot of the affixment ring.

In order to secure the cladding 14 to the affixment ring 24, a plurality of fluked retention tabs 42 project axially from the inner face 44 of the wheel cladding 14. As can be observed in FIG. 9, the tabs 42 and the wheel cladding 14 are formed of unitary one piece construction. Each tab 42 is received in a slot or aperture 46 formed in the affixment ring 24 as illustrated in FIG. 6 and FIG. 9.

It should be noted that the affixment ring 24 is thicker at its inner and outer peripheries, leaving a channel or space 48 between the wheel rim and the annulus 26. An enlarged fluke 50 at the distal end of the retention tab 42 is accommodated within the space 48.

Figure 7:
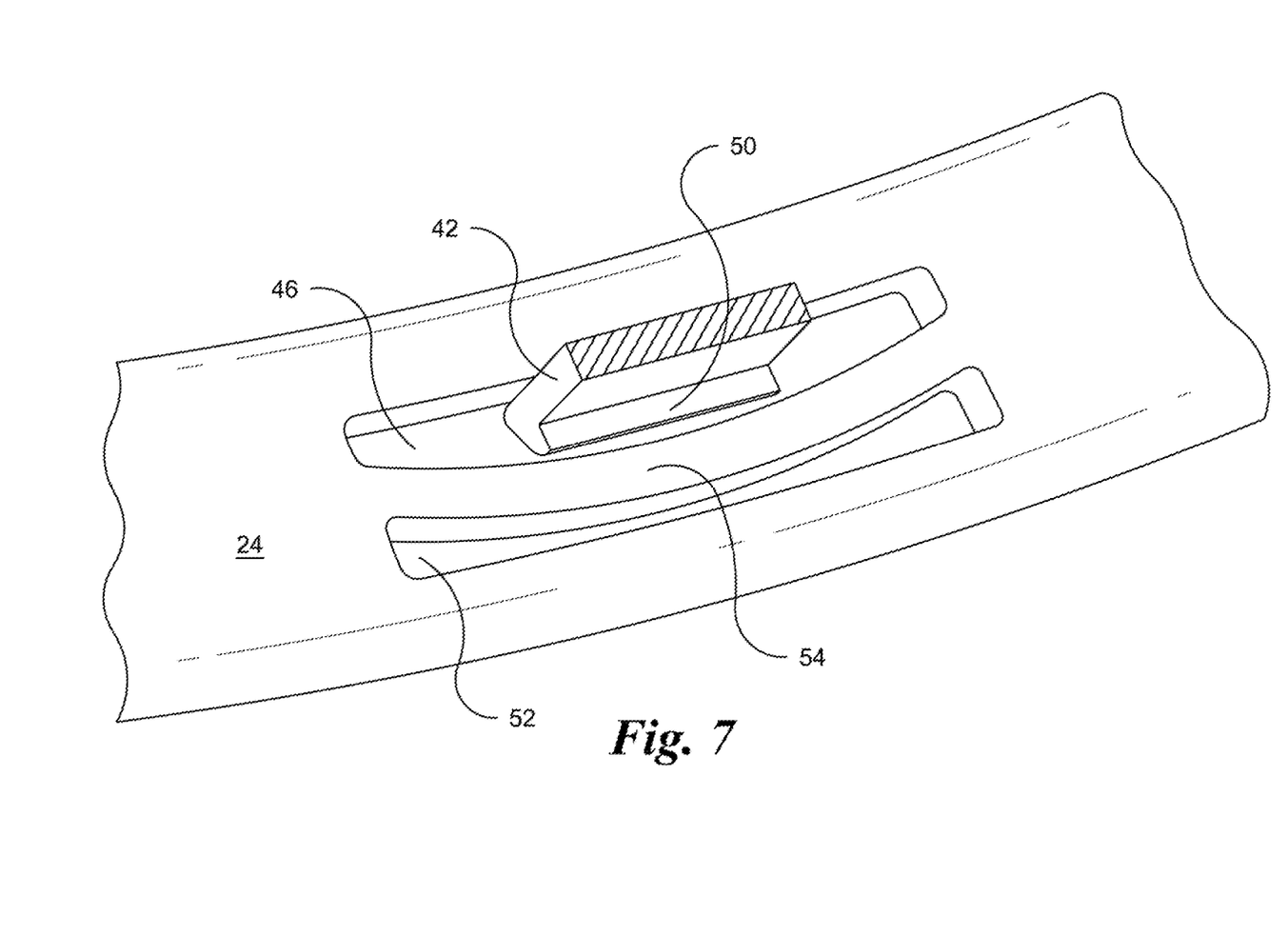
FIG. 7 is an enlarged scale fragmentary isometric view of the affixment ring and showing a retention tab of the cladding engaging a slot of the affixment ring.

With reference now to FIG. 7, it will be noted that each slot 46 includes a radially spaced companion slot 52, with the slots 46, 52 being separated by a flex span 54. The flex span 54 bends radially outwardly into the slot 52 to permit passage of the fluke 50 and snaps back after the fluke 50 has passed through the slot and into the space 48 to secure the cladding 14 to the ring 24.

Figure 6:
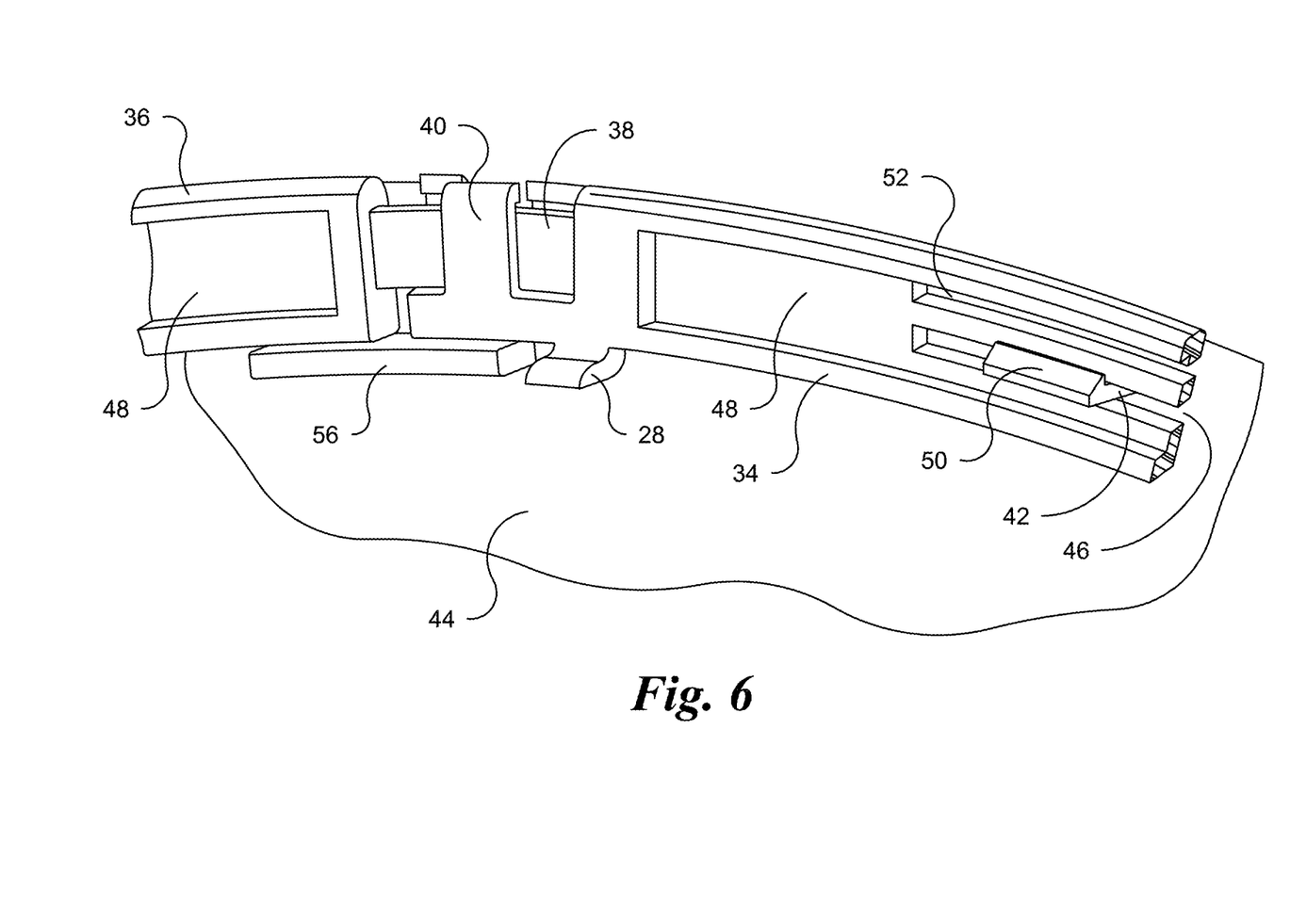
FIG. 6 is an enlarged scale fragmentary auxiliary isometric view of the underside of the affixment ring and inner face of the wheel cladding as viewed from the plane 6-6 of FIG. 8.
Figure 8:
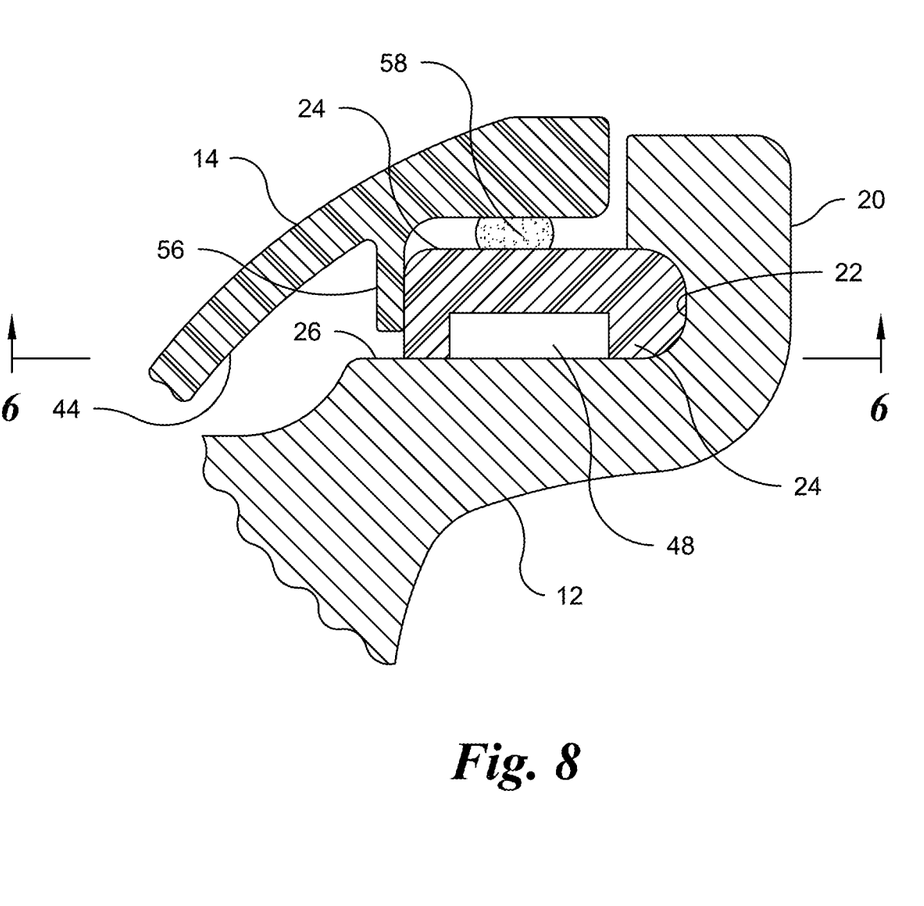
FIG. 8 is an enlarged scale fragmentary sectional view through the wheel rim of the clad wheel, the same being taken substantially along the plane 8-8 of FIG. 1 and showing an optional foam strip positioned between the inner face of the affixment ring and the cladding.

With reference now to FIG. 6 and FIG. 8, it should be noted that an arcuate flange 56 extends axially from the inner face 44 of the cladding 14 and abuts the radially inner periphery of the affixment ring 24, with the flange 56 preferably overlapping each mortise and tenon joint to reinforce such joints and also to preclude the affixment ring from flexing radially inwardly so as to prevent disengagement of the ring outer periphery from the undercut 22.

As it will be noted from an examination of FIG. 8 and FIG. 9, a compressible foam strip 58 may be positioned between the axially inner face 44 of the cladding 14 and registered surfaces of the affixment ring 24.

It should be additionally noted that while engagement between the wheel cladding 14 and the affixment ring 24 and engagement between the affixment ring 24 and the wheel rim undercut 22 serve to permanently secure the wheel cladding 14 to the wheel, additional securement may be optionally provided at the wheel hub 16 by flanged lug nuts 60 which secure the wheel 10 to the vehicle axle or by flanged lug nut covers, in accordance with U.S. Pat. No. 4,998,780, the entirety of which is incorporated herein by reference.

It should also be noted that the wheel 10 may be formed of any suitable metal such as by way of example aluminum, magnesium, or the like; the cladding may be molded of, by way of example, ABS, ABS+PC or nylon based thermoplastics and the affixment ring may be formed of acetyl or nylon based thermoplastics, for example.

Thus, it will be seen that there is provided a system for wheel cladding affixment which achieves the various aspects, features and considerations of the present invention and which is well suited to meet the conditions of practical use.

As various changes might be made in the exemplary embodiment above set forth, it is to be understood that all matter herein described or shown in the accompanying drawings is to be interpreted as illustrative and not in a limiting sense.

Having thus described the invention, there is claimed as new and desired to be secured by Letter Patent:

1. A composite wheel assembly comprising a metal wheel, wheel cladding and a system for affixment of the wheel cladding to the wheel, the wheel having a rim, the rim including a planar annulus and a rim flange, the system including a radial undercut formed in the rim flange, an affixment ring overlying the annulus, the affixment ring having a radially outer periphery, the radially outer periphery being seated in the undercut, the affixment ring having a plurality of axial apertures, the cladding having an inner face, a plurality of axial retention tabs formed in one piece with the cladding and extending from the inner face, each retention tab being secured through snap fit engagement in one of the apertures of the plurality of apertures, whereby the wheel cladding is affixed to the wheel through the affixment ring.

2. A composite wheel assembly constructed in accordance with claim 1 wherein each tab includes a fluke out at its distal end, the fluke being positioned between the affixment ring and the annulus.

3. A composite wheel assembly constructed in accordance with claim 1 wherein the apertures comprise slots.

4. A composite wheel assembly as constructed in accordance with claim 3 wherein the slots are arrayed in radially spaced registered pairs, each slot of a pair being separated by a span, the span being flexible to permit passage of a fluke during assembly.

5. A composite wheel assembly as constructed in accordance with claim 1 wherein the affixment ring further includes at least one axial pilot finger and the annulus includes at least one socket, the pilot finger being seated in the socket whereby rotation of the affixment ring and the wheel cladding relative to the metal wheel is precluded.

6. A composite wheel assembly as constructed in accordance with claim 1 wherein the affixment ring is comprised of arcuate segments, each arcuate segment having two end portions, the end portions of adjacent arcuate segments being interlocked together.

7. A composite wheel assembly as constructed in accordance with claim 6 wherein one end of each arcuate segment includes a tenon extending therefrom and the other end of each arcuate segment includes a mortise, the tenon of one segment extending into the mortise of the adjacent segment, whereby the segments are interlocked together.

8. A composite vehicle wheel as constructed in accordance with claim 1 wherein the inner face of the wheel cladding includes arcuate flanges, the arcuate flanges abutting the radially inner periphery of the affixment ring, whereby the outer periphery of the affixment ring is secured within the radial undercut.

9. A composite wheel assembly as constructed in accordance with claim 6 wherein the inner face of the wheel cladding includes arcuate flanges, the arcuate flanges abutting the radially inner periphery of the affixment ring, the arcuate flanges being registered with the interlocked end portions of adjacent segments.

10. A method of affixing a wheel cladding to a metal wheel, the wheel including a rim having a rim flange, the method comprising the steps of:
  a) providing an undercut in the rim flange;
  b) providing a ring having a radially outer periphery, a radially inner periphery and at least one axial pilot finger;
  c) inserting the axial pilot finger into a socket formed in the metal wheel and positioning the outer periphery of the ring in the undercut; and thereafter d) securing the cladding to the ring by:
    i) providing at least one aperture in the ring;
    ii) providing at least one unitary axial tab on the inner face of the cladding; and
    iii) seating the at least one tab in the at least one aperture.

11. A method of affixing wheel cladding to a metal wheel in accordance with claim 10 further including the step of:
  e) providing an arcuate flange on the inner face of the cladding; and
  f) abutting the arcuate flange against the inner periphery of the ring.

12. A method of affixing wheel cladding to a vehicle wheel in accordance with claim 10 wherein step b) includes:
  i) providing a plurality of arcuate segments; and
  ii) assembling the segments in end to end relationship to form the ring.

13. A method of affixing wheel cladding to a metal wheel in accordance with claim 12 wherein one end of each segment includes a tenon extending therefrom and the other end of each segment includes a mortise, the step of assembling the segments in end to end relationship including the step of inserting the tenon of one segment into the mortise of an adjacent segment.

14. A method of affixing wheel cladding to a metal wheel in accordance with claim 13 wherein the mortise is formed of a plurality of staggered mortise fingers which project radially from the outer periphery of the ring and the step of inserting the tenon of one segment into the mortise of an adjacent segment includes bending the mortise fingers axially while moving the mortise fingers radially relative to the tenon.

15. In a vehicle wheel assembly including a metal wheel having a wheel rim, the wheel rim including a wheel rim flange, the wheel assembly further including a wheel cladding overlying the metal wheel, the cladding having an inner face, the improvement comprising an affixment system for securing the cladding to the metal wheel, the affixment system including a radial undercut formed in the wheel rim flange and a ring, the ring having a radially outer periphery, a radially inner periphery, at least one aperture and at least one axial pilot finger, the radially outer periphery being seated in the undercut, the at least one axial pilot finger being seated in a socket formed in the metal wheel, the cladding including at least one tab unitarily formed therewith and projecting axially from the inner face of the cladding, the at least one tab being seated in the at least one aperture whereby the cladding is fixed to the ring.

16. In a vehicle wheel assembly as constructed in accordance with claim 15, the improvement further including an arcuate flange projecting axially from the inner face of the cladding, the axial flange abutting the inner periphery of the ring, whereby dislodgment of the outer periphery of the ring from the radial undercut is precluded.

17. In a vehicle wheel assembly as constructed in accordance with claim 15, the improvement further including the ring being formed of a plurality of interlocking segments.

18. In a vehicle wheel assembly as constructed in accordance with claim 15, the improvement further comprising a plurality of sockets formed in the wheel and a like plurality of pilot fingers projecting axially from the ring, the pilot fingers being seated in the sockets.

\* \* \* \* \*